US006655886B2

(12) United States Patent
Grandy

(10) Patent No.: US 6,655,886 B2
(45) Date of Patent: Dec. 2, 2003

(54) RAILCAR LADING ANCHOR

(75) Inventor: Robert Grandy, Hinsdale, IL (US)

(73) Assignee: Ireco, LLC, Bensenville, IL (US)

( * ) Notice: Subject to any disclaimer, the term of this patent is extended or adjusted under 35 U.S.C. 154(b) by 0 days.

(21) Appl. No.: 09/834,133

(22) Filed: Apr. 13, 2001

(65) Prior Publication Data

US 2002/0102145 A1 Aug. 1, 2002

Related U.S. Application Data

(60) Provisional application No. 60/265,933, filed on Feb. 1, 2001.

(51) Int. Cl.[7] ............................................. B61D 45/00
(52) U.S. Cl. .................. 410/112; 410/106; 410/109; 410/116
(58) Field of Search ................. 410/101, 106, 410/109, 110, 112, 113, 114, 115, 116

(56) References Cited

U.S. PATENT DOCUMENTS

| | | | | |
|---|---|---|---|---|
| 2,605,721 A | * | 8/1952 | Johnson et al. ............. | 410/112 |
| 2,661,704 A | * | 12/1953 | Johnson ....................... | 410/112 |
| 2,675,766 A | * | 4/1954 | Johnson ....................... | 410/112 |
| 2,716,383 A | * | 8/1955 | Johnson ....................... | 410/112 |
| 2,897,771 A | * | 8/1959 | Johnson ....................... | 410/102 |
| 3,179,068 A | * | 4/1965 | Jensen ......................... | 410/114 |
| 4,169,415 A | * | 10/1979 | Winsor ........................ | 410/114 |
| 6,106,206 A | * | 8/2000 | Spier et al. ................. | 410/152 |
| 6,402,446 B1 | * | 6/2002 | Nadherny et al. .......... | 410/100 |

* cited by examiner

Primary Examiner—Joseph D. Pape
Assistant Examiner—Paul Chenevert
(74) Attorney, Agent, or Firm—Edward D. Gilhooly & Assoc

(57) ABSTRACT

Tie down anchors for a railcar having a body arranged and affixed to the side wall to serve at an anchoring point. The upper and lower end sections have expanded widths on which a pair of cutout areas are formed to serve as a vent opening for moisture to escape from behind a mounted anchor in a first embodiment. In a second embodiment, holes are formed through the upper and lower end sections to create a moisture vent opening.

5 Claims, 4 Drawing Sheets

RAILCAR LADING ANCHOR

This application claims benefit of the filing date of the provisional application entitled RAILCAR LADING ANCHOR, Serial No. 60/265,933 filed Feb. 1, 2001.

BACKGROUND OF THE INVENTION

1. Field of the Invention

This invention relates in general to railcars and, more particularly, to improved railcar lading anchors.

2. Summary of the Prior Art

In the transport of lading in railcars, it is advantageous for the cargo to be secured in place to prevent shifting and damage during transport. One common technique for securing lading, such as in a conventional boxcar, utilizes a lading tie anchor generally attached to the boxcar side walls at the interior side posts. The lading tie anchor provides a convenient anchoring point for steel banding which is used to restrain the car's lading. Examples of known prior tie bar designs for anchors are disclosed in U.S. Pat. No. 3,179,068 issued Apr. 20, 1965.

In its mounted position, moisture tends to accumulate behind the tie bar anchor, which is mounted on a recess as is known. Certain commodities, such as wood pulp, have a very high moisture content when loaded into the railcar, which condenses on the backside of tie bar anchor and has nowhere to effectively escape because the space behind the tie bar anchor is generally sealed by welds. This condensation causes the backside of the lading tie anchor to rust. Such rust eventually travels down the side wall of the railcar and spoils other loads if they come in contact with the side wall. Accordingly, it is desirable in the prior art to provide a tie down anchor that will alleviate the problems associated with condensation forming on the anchor member.

SUMMARY OF THE INVENTION

It is, therefore, an objective of the invention to provide railcar lading tie down anchors capable of preventing the formation of rust on its surface as a result of the moisture build-up within a railcar, such as a boxcar. The tie bar anchors herein disclosed functionally serve as anchoring points for steel banding and the like as commonly employed in the securement of lading. The tie bar anchors of the invention are further provided with access openings to permit moisture accumulated behind it to escape and alleviate the buildup of rust on its body. In addition, the tie bar anchors of the invention may be coated with rust inhibitors to further reduce the problem.

DESCRIPTION OF THE PREFERRED EMBODIMENTS

Figure 4:
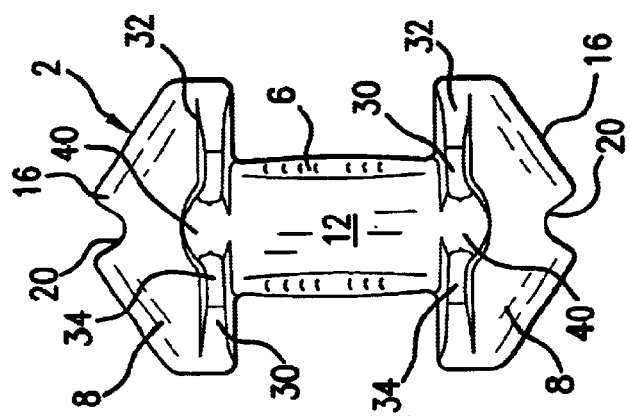
FIG. 4 is a back elevational view of the tie down anchor of FIG. 1.

Referring now to FIGS. 1–7, there is illustrated a first embodiment of the improved tie down anchors of the invention, generally designated by reference numeral 2. The tie down anchor 2 serves as an interior side wall anchoring point for steel banding (not shown) and the like commonly used to secure lading within a railcar, such as, for example, in a boxcar. The tie down anchor 2 may be attached at any desired location on the side wall, such as, for example, the locations of known types of tie down anchors described and illustrated in U.S. Pat. No. 3,179,068 to Evans issued Apr. 20, 1965.

The tie down anchor 2 is formed from a forged metal having a unitary body 4. The body 4 includes a narrowed vertical intermediate portion 6 and a pair of opposite expanded end sections 8. The vertical walls 10 and 12 of the immediate portion 6 and end sections 8 are generally flat with slightly rounded edge portions 14a, 14b and 14c. The edge portions 16 of edge sections 8 are tapered and extend respectively upward or downward toward a central vertical axis where mounted. A cutout area 20 is formed about the central vertical axis in both end sections. As will be apparent, the cutout areas serve as vent openings when the anchor 2 is welded into position to allow moisture resulting from condensation to escape and be released from the rear of tie down anchor 2. The cutout areas 20 significantly alleviate the formation of rust on the backside of the tie down anchor 2.

Figure 2:
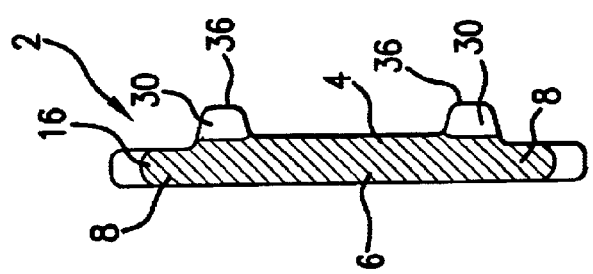
FIG. 2 is a side elevational view, with parts in section, taken along lines 2—2 of FIG. 1.
Figure 3:
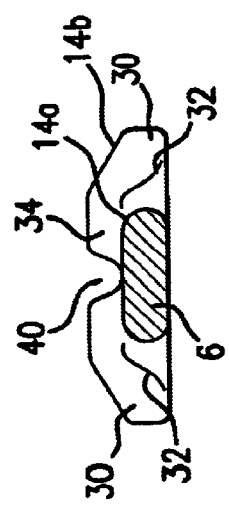
FIG. 3 is a bottom plan view, with parts in section, taken along lines 3—3 of FIG. 1.
Figure 1:
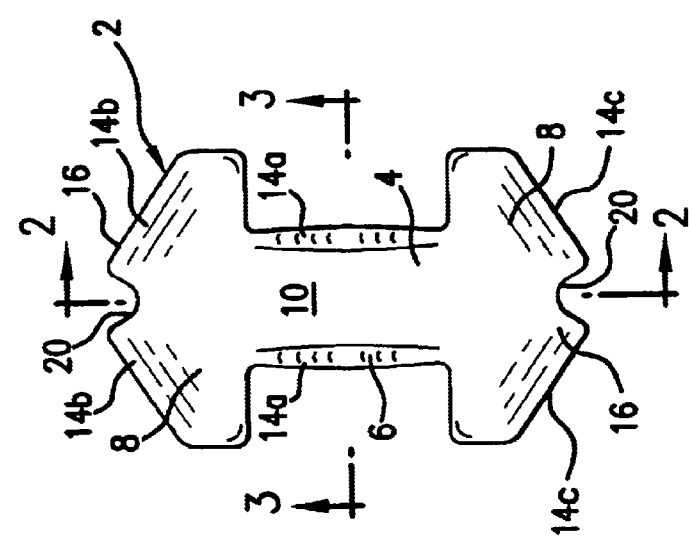
FIG. 1 is a front elevational view of a first embodiment of the tie down anchor of the invention.

As seen in FIGS. 1–4, a pair of rear projecting shoulders or ledges 30 are respectively formed on the back side of each of the end sections 8 and are horizontally arranged in spaced relationship. The shoulders 30 each have tapered ends 32 and a central portion 34 forming abutment ends 36 (FIG. 2). Both shoulders 30 have cutout areas 40 to form moisture vent openings for release of condensation created in the space between shoulders 30.

Figure 5:
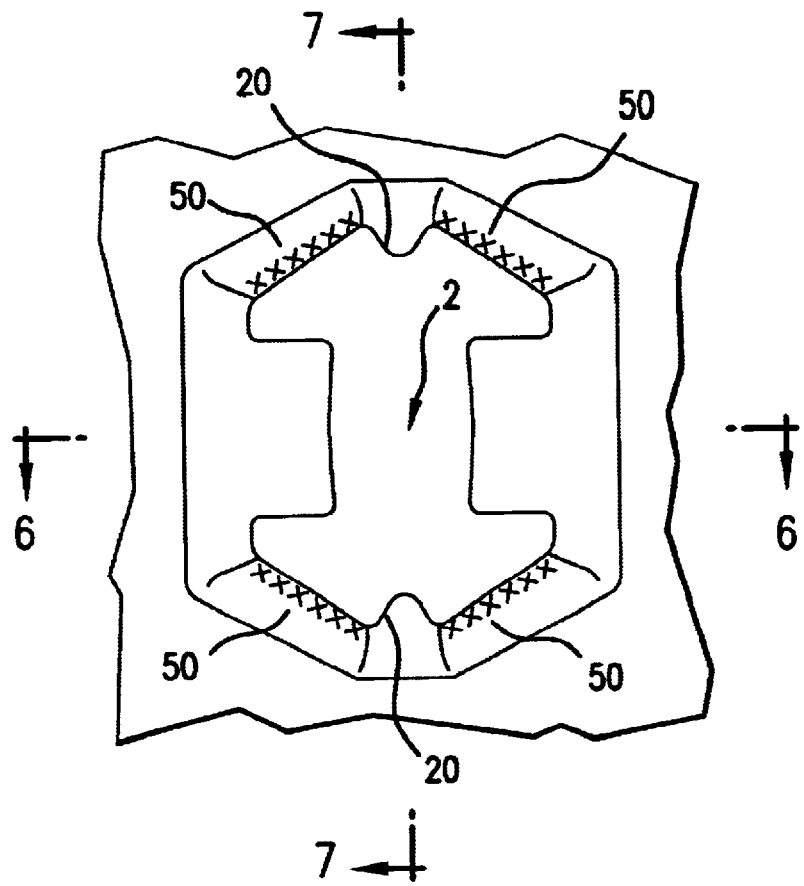
FIG. 5 is a front partial view of the tie down anchor of FIG. 1 mounted in a depression in the steel lining of the interior of a railcar.
Figure 6:
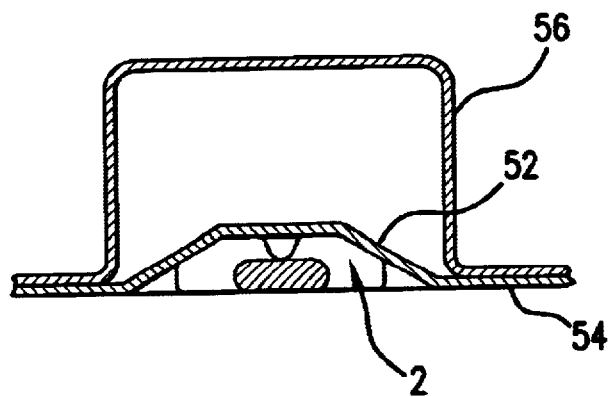
FIG. 6 is a top plan, with parts in section, of the tie down anchor taken along lines 6—6 of FIG. 5.
Figure 7:
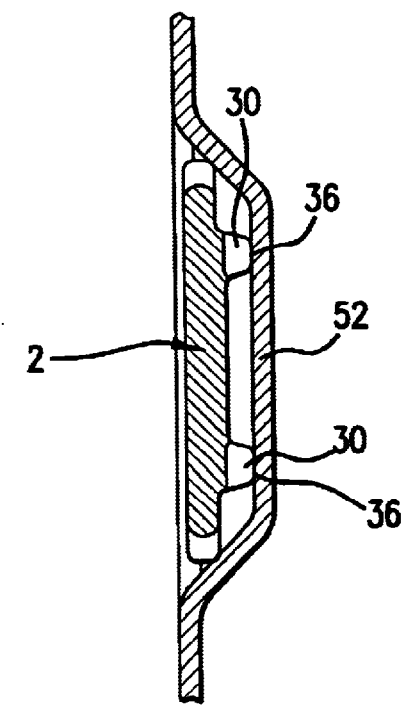
FIG. 7 is a side elevational view, with parts in section, taken along lines 7—7 of FIG. 5.
Figure 11:
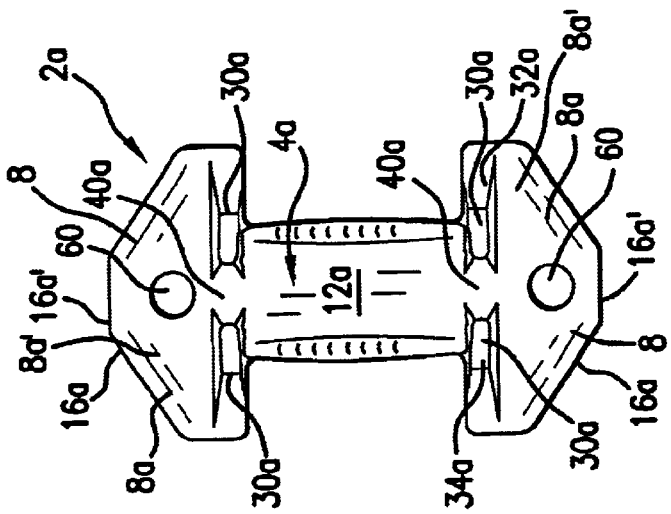
FIG. 11 is a back elevational view of the tie down anchor of FIG. 8.

As seen in FIGS. 5–7, the tie down anchor 2 is attached by welds 50 applied to edge portions 16 to a depression 52 of known configuration formed in steel lining 54 covering a conventional hat-shaped interior side post 56. In its mounted position, the abutment ends 36 are in contact with a portion of the steel lining 54, which creates a void behind the back surface of body 4.

As is clear from the foregoing, the cutout areas 20 and 40 form moisture vent openings in the mounted position of the tie down anchor. To further inhibit the formation of rust on the tie down anchor 2, the body 4 may have a powder coating used for rustproofing.

Referring now to FIGS. 8–14, there is illustrated a second embodiment of the improved tie down anchors of the invention, generally designated by reference numeral 2a. In the same manner as the first embodiment of the invention described with reference to FIGS. 1–7, the tie down anchor 2a serves as an interior side wall anchoring point for steel banding (not shown) and the like commonly used to secure lading within a railcar, such as, for example, in a boxcar. The tie down anchor 2a may be attached at any desired location on the side wall, as previously described with reference to the first embodiment.

The tie down anchor 2a is formed from a forged metal having a unitary body 4a. The body 4a includes a narrowed vertical intermediate portion 6a and a pair of opposite expanded end sections 8a that are generally flat with slightly rounded edge portions 14d, 14e and 14f. The edge portions 16a of end sections 8a are tapered and respectively extend upward or downwardly toward a flat intermediate edge 16a'. Holes 60 are respectively formed through the walls of end sections 8a. As will be apparent, the holes 60 serve, when the anchor 2a is welded into position, as vent openings to allow moisture to escape and be released from the rear of tie down anchor 2a resulting from condensation. The holes 60 significantly alleviate the formation of rust on the tie down anchor 2 without interfering with the secure mounting of tie down anchor 2a on the railcar.

Figure 9:
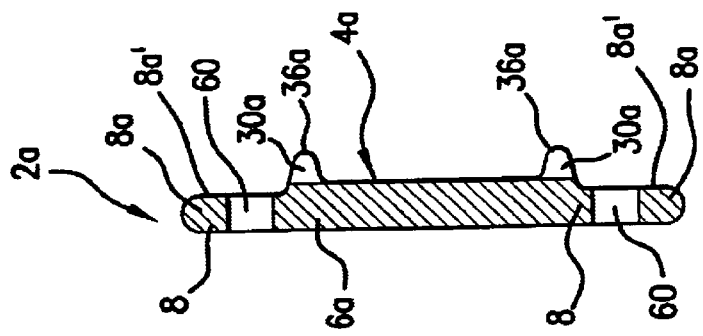
FIG. 9 is a side elevational view, with parts in section, taken along lines 9—9 of FIG. 8.
Figure 10:
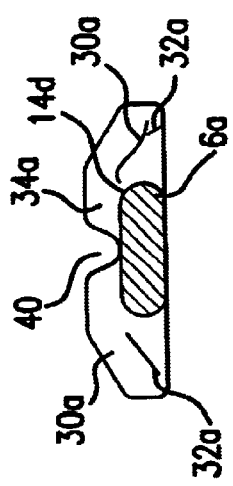
FIG. 10 is a bottom plan view, with parts in section, taken along lines 10—10 of FIG. 8.
Figure 8:
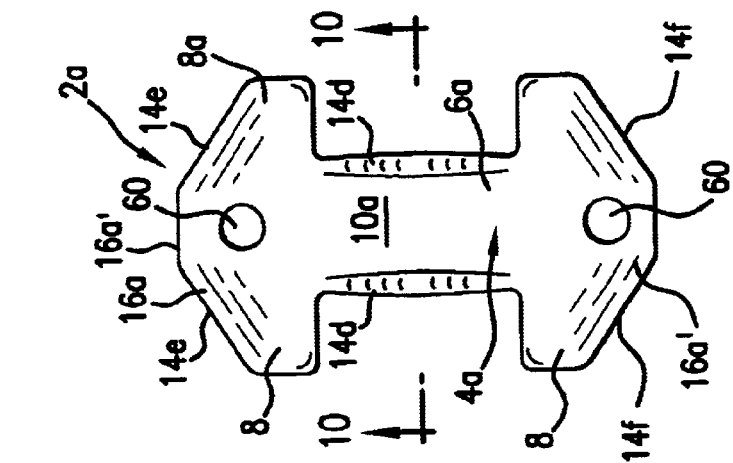
FIG. 8 is a front elevational view of a second embodiment of the tie down anchor of the invention.

As seen in FIGS. 8–11, a pair of projecting shoulders or ledges 30a are respectively formed on the backside 8a' of each end section 8a and are horizontally arranged in parallel relationship. The shoulders 30a each have tapered ends 32a and a central portion 34a forming abutment ends 36a (FIG. 9). Each of the shoulders 30a have cutout areas 40a to form moisture vent openings for condensation created in the space between shoulders 30a.

Figure 13:
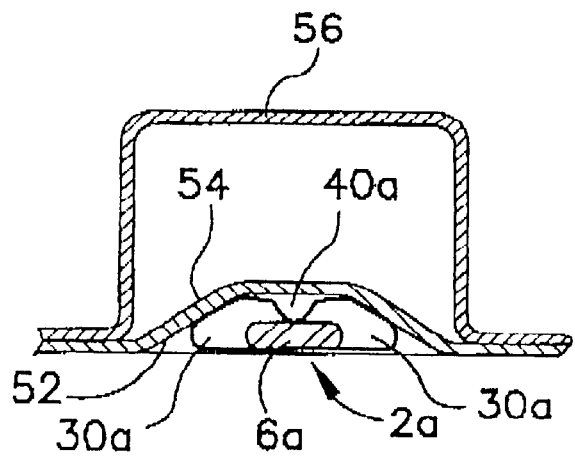
FIG. 13 is a top plan view, with parts in section, of the tie down anchor taken along lines 13—13 of FIG. 12.
Figure 12:
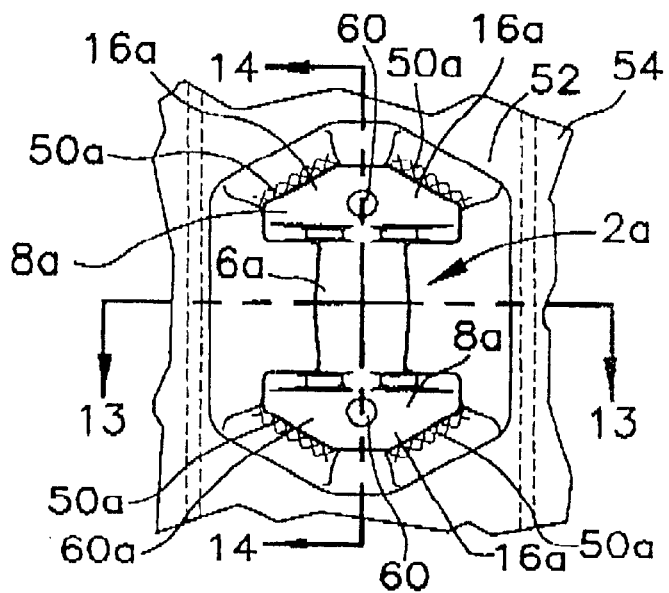
FIG. 12 is a front partial view of the tie down anchor of FIG. 8 mounted in a depression in the steel lining of the interior of a railcar.
Figure 14:
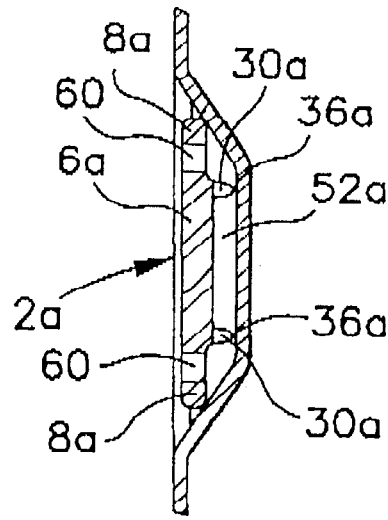
FIG. 14 is a side elevational view, with parts in section, taken along lines 14—14 of FIG. 12.

As in FIGS. 12–14, the tie down anchor 2a is attached by welds 50a applied to edge portions 16a to a depression 52 of known configuration formed in steel lining 54 covering a conventional hat-shaped interior side post 56. In its mounted position, the abutment ends 36a are in contact with a portion of the steel lining 54 which creates a void behind the back surface of body 4a.

As is clear from the foregoing, the holes 60 and cutout areas 40 form moisture vent openings in the mounted position of the tie down anchor.

What is claimed is:

1. A lading tie down anchor for attachment to a depression in a steel lining of a railcar comprising a unitary body having a backside arranged to be attached to the steel lining, said body having opposed end sections formed with tapered end portions terminating with upper and lower edges and a vent opening formed through said tapered end portions to allow moisture to escape from said backside, and said body including a pair of projecting shoulders forming abutment edges, said vent opening being a hole formed through said tapered end portions at a location spaced from said upper and lower edges.

2. A lading tie down anchor for attachment to a depression in a steel lining of a railcar comprising a unitary body having a backside arranged to be attached to the steel lining, said body having opposed end sections formed with vent holes openings formed through said end sections to allow moisture to escape from said backside, wherein said body includes a pair of projecting shoulders forming respective abutment edges, said abutment edges having cutout areas to form additional vent openings.

3. A lading tie down lading anchor for attachment to a depression in a steel lining of a railcar comprising a unitary body having a backside arranged to be attached to the steel lining, said body having opposed end sections formed with egde portions and a pair of vent holes respectively formed through both of said end sections to allow moisture to escape from said backside, said vent holes respectively are positioned near said edge portions at positions spaced from said edge portions.

4. A lading tie down lading anchor for attachment to a depression in a steel lining of a railcar comprising a unitary body having a backside arranged to be attached to the steel lining, said body having opposed end sections formed with tapered end portions and a pair of vent holes respectively formed through both of said tapered end portions to allow moisture to escape from said backside, and a pair of spaced shoulders horizontally arranged on said backside of said unitary body, siad shoulders having cutout area to permit escape of moisture formed on said backside.

5. A lading tie down anchor for attachment to a depression in a steel lining of a railcar comprising a unitary body having a backside arranged to be attached to the steel lining, said backside having a pair of spaced projecting shoulders being horizontally arranged, said shoulders each having cutout areas to permit the escape of moisture, said body having opposed end sections formed with tapered end portions, and said end portions each having a hole for allowing the escape of moisture from the backside of said body.

* * * * *